(12) United States Patent
Desai

(10) Patent No.: US 11,765,099 B2
(45) Date of Patent: *Sep. 19, 2023

(54) RESOURCE ALLOCATION USING DISTRIBUTED SEGMENT PROCESSING CREDITS

(71) Applicant: EMC IP Holding Company LLC, Hopkinton, MA (US)

(72) Inventor: Keyur B. Desai, Cary, NC (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/822,534

(22) Filed: Aug. 26, 2022

(65) Prior Publication Data

US 2022/0407817 A1    Dec. 22, 2022

Related U.S. Application Data

(63) Continuation of application No. 17/204,318, filed on Mar. 17, 2021, now Pat. No. 11,431,647, which is a
(Continued)

(51) Int. Cl.
*H04L 47/783* (2022.01)
*G06F 16/907* (2019.01)
(Continued)

(52) U.S. Cl.
CPC .......... *H04L 47/783* (2013.01); *G06F 16/907* (2019.01); *G06F 21/64* (2013.01);
(Continued)

(58) Field of Classification Search
CPC ..... H04L 47/783; H04L 47/822; H04L 67/10; H04L 67/42; G06F 16/907; G06F 21/64
See application file for complete search history.

(56) References Cited

U.S. PATENT DOCUMENTS

| 3,350,702 A | 10/1967 | Herman |
| 5,453,982 A | 9/1995 | Pennington et al. |

(Continued)

FOREIGN PATENT DOCUMENTS

| CN | 103353867 A | 10/2013 |
| CN | 105487818 A | 4/2016 |

(Continued)

OTHER PUBLICATIONS

International Preliminary Report on Patentability received for PCT Patent Application No. PCT/US2019/043970, dated Apr. 22, 2021, 10 pages.

(Continued)

*Primary Examiner* — Jonathan A Bui
(74) *Attorney, Agent, or Firm* — Workman Nydegger

(57) ABSTRACT

Systems and methods for allocating resources are disclosed. Resources as processing time, writes or reads are allocated. Credits are issued to the clients in a manner that ensure the system is operating in a safe allocation state. The credits can be used not only to allocate resources but also to throttle clients where necessary. Credits can be granted fully, partially, and in a number greater than requested. Zero or negative credits can also be issued to throttle clients. Segment credits are associated with identifying unique fingerprints or segments and may be allocated by determining how many credits a CPU/cores can support. This maximum number may be divided amongst clients connected with the server.

20 Claims, 9 Drawing Sheets

Related U.S. Application Data continuation of application No. 16/154,671, filed on Oct. 8, 2018, now Pat. No. 11,005,775.

(51) Int. Cl.
*G06F 21/64* (2013.01)
*H04L 47/70* (2022.01)
*H04L 67/10* (2022.01)
*H04L 67/01* (2022.01)

(52) U.S. Cl.
CPC ............ *H04L 47/822* (2013.01); *H04L 67/01* (2022.05); *H04L 67/10* (2013.01)

(56) References Cited

U.S. PATENT DOCUMENTS

| | | | |
|---|---|---|---|
| 5,586,121 | A | 12/1996 | Moura et al. |
| 5,778,320 | A | 7/1998 | Drozt et al. |
| 5,812,545 | A | 9/1998 | Liebowitz et al. |
| 5,889,956 | A * | 3/1999 | Hauser .................... H04L 47/30 709/226 |
| 5,956,321 | A | 9/1999 | Yao et al. |
| 6,438,141 | B1 | 8/2002 | Hanko et al. |
| 6,459,901 | B1 | 10/2002 | Chawla et al. |
| 6,467,024 | B1 | 10/2002 | Bish et al. |
| 6,502,165 | B1 | 12/2002 | Kishi et al. |
| 7,269,697 | B1 | 9/2007 | Reeve et al. |
| 7,461,236 | B1 | 12/2008 | Wentzlaff |
| 7,478,158 | B1 | 1/2009 | Rodgers et al. |
| 7,539,735 | B2 | 5/2009 | Fruchtman et al. |
| 7,583,658 | B1 | 9/2009 | Wang et al. |
| 7,685,306 | B2 | 3/2010 | McEnroe et al. |
| 7,698,115 | B2 | 4/2010 | Voellm et al. |
| 7,707,248 | B2 | 4/2010 | Simard et al. |
| 8,306,036 | B1 | 11/2012 | Bollay |
| 8,381,217 | B1 * | 2/2013 | Wijayaratne ............... G06F 9/50 718/102 |
| 8,400,924 | B2 | 3/2013 | Wang et al. |
| 9,619,127 | B2 | 4/2017 | Varner et al. |
| 10,652,796 | B2 | 5/2020 | Laliberte |
| 2002/0053011 | A1 | 5/2002 | Aiken et al. |
| 2003/0158913 | A1 | 8/2003 | Agnoli et al. |
| 2004/0139207 | A1 | 7/2004 | de Jong |
| 2004/0165598 | A1 | 8/2004 | Shrimali et al. |
| 2004/0267932 | A1 | 12/2004 | Voellm et al. |
| 2005/0068911 | A1 | 3/2005 | Miyake et al. |
| 2006/0179182 | A1 | 8/2006 | Chadha et al. |
| 2007/0015525 | A1 | 1/2007 | Beming et al. |
| 2007/0220262 | A1 | 9/2007 | Suzuki et al. |
| 2008/0034021 | A1 | 2/2008 | De Spiegeleer |
| 2008/0126606 | A1 | 5/2008 | Wang et al. |
| 2008/0307094 | A1 | 12/2008 | Karonen et al. |
| 2009/0138616 | A1 | 5/2009 | Alvarez et al. |
| 2009/0171812 | A1 | 7/2009 | Fadell |
| 2009/0178050 | A1 | 7/2009 | Bichler et al. |
| 2010/0031157 | A1 | 2/2010 | Neer et al. |
| 2011/0032947 | A1 | 2/2011 | Brueggen |
| 2011/0184998 | A1 | 7/2011 | Palahnuk et al. |
| 2012/0226712 | A1 | 9/2012 | Vermeulen et al. |
| 2012/0281708 | A1 | 11/2012 | Chauhan et al. |
| 2012/0327779 | A1 | 12/2012 | Gell et al. |
| 2013/0055279 | A1 * | 2/2013 | Sistare ..................... G06F 9/50 718/104 |
| 2013/0061233 | A1 * | 3/2013 | Zhou ..................... G06F 9/4881 718/103 |
| 2013/0097680 | A1 | 4/2013 | Bendapudi et al. |
| 2013/0122858 | A1 | 5/2013 | Bedingfield et al. |
| 2013/0128082 | A1 | 5/2013 | Kiyosawa et al. |
| 2013/0191929 | A1 | 7/2013 | Yin et al. |
| 2013/0297857 | A1 | 11/2013 | Sela |
| 2014/0101113 | A1 | 4/2014 | Zhang et al. |
| 2014/0195688 | A1 | 7/2014 | Archer et al. |
| 2015/0007189 | A1 | 1/2015 | De et al. |
| 2015/0067691 | A1 * | 3/2015 | Johnson ................ G06F 9/5027 718/103 |
| 2016/0005007 | A1 | 1/2016 | Marsico |
| 2016/0072691 | A1 * | 3/2016 | Xu ...................... H04B 7/18578 370/252 |
| 2017/0124737 | A1 | 5/2017 | Joseph et al. |
| 2017/0177253 | A1 | 6/2017 | Hayes et al. |
| 2017/0277620 | A1 | 9/2017 | Kadioglu |
| 2018/0077293 | A1 | 3/2018 | Chai |
| 2018/0097707 | A1 | 4/2018 | Wright et al. |
| 2018/0113804 | A1 | 4/2018 | Hsu et al. |
| 2018/0278647 | A1 | 9/2018 | Gabaev et al. |
| 2019/0004862 | A1 | 1/2019 | Bernat et al. |
| 2019/0068515 | A1 | 2/2019 | Seely et al. |
| 2019/0261225 | A1 * | 8/2019 | Eswarakava .......... H04W 48/06 |
| 2019/0348158 | A1 | 11/2019 | Livesay et al. |
| 2020/0014804 | A1 | 1/2020 | Pollak |
| 2020/0112516 | A1 | 4/2020 | Desai |

FOREIGN PATENT DOCUMENTS

| | | |
|---|---|---|
| EP | 3350702 A1 | 7/2018 |
| WO | 2005/079001 A1 | 8/2005 |
| WO | 2008/118608 A1 | 10/2008 |
| WO | 2017/123335 A1 | 7/2017 |

OTHER PUBLICATIONS

International Preliminary Report on Patentability received for PCT Patent Application No. PCT/US2019/043976, dated Apr. 22, 2021, 8 pages.
International Search Report and Written Opinion dated Oct. 2, 2019 in corresponding PCT application PCT/US2019/043970.
International Search Report and Written Opinion issued in Application No. PCT/US2019/044209 dated Oct. 18, 2019.
International Search Report for PCT/US2019/043976 and dated Sep. 18, 2019.
Merriam-Webster's Collegiate Dictionary 70 (10th ed. 1993) (Year: 1993).
Brad Gilmer, "ATM for broadcast", Nov. 1, 2002, TV Tech, pp. 1-5 (Year: 2002).
International Preliminary Report on Patentability received for PCT Patent Application No. PCT/US2019/044209, dated Apr. 22, 2021, 9 pages.
Slutsky, David J. "The use of tables", 2014, Journal of wrist surgery vol. 3, 4, p. 219. (Year: 2014).
Office Action dated Jul. 11, 2023 in CN application 201980066423.4.

* cited by examiner

RESOURCE ALLOCATION USING DISTRIBUTED SEGMENT PROCESSING CREDITS

FIELD OF THE INVENTION

Embodiments of the present invention relate to systems and methods for allocating resources. More particularly, embodiments of the invention relate to systems and methods for resource allocation when performing data protection operations such as Distributed Segment Processing (DSP) and/or de-duplication. Appendix A forms part of the present disclosure and is incorporated herein in its entirety by this reference.

BACKGROUND

In a single node or a distributed/scaleout cluster environment, allocating resources can be a challenging task. The task is further complicated when attempting to ensure that the resources are allocated fairly to all of the clients using the available resources. For example, any one client should not be able to have an unfairly large share of the available resources. At the same time, there is a need to satisfy quality of service (QOS) requirements.

More specifically, data protection operations (e.g., backup, restore) are often associated with resource allocation issues and quality of service (QOS) issues. These issues arise when some clients are using too many resources and other clients are therefore neglected or unable to acquire the necessary resources. In addition, the QOS often suffers when the demand for resources is more than the node or cluster can bear. To avoid this circumstance or to correct this circumstance, there is a need to throttle requests from any particular client at any particular time. Consequently, systems and methods are needed to fairly allocate resources while, at the same time, ensuring or meeting quality of service requirements.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for performing data protection operations. Examples of data protection operations include, but are not limited to, resource allocation operations including stream allocations, read allocations, segment processing allocations, or the like. Data protection operations may also include backup operations, restore operations, deduplication operations, mirroring operations, data replication operations, and the like or combination thereof.

Embodiments of the invention relate to systems and methods for allocating resources in a computing environment. Embodiments of the invention further relate to systems and methods for measuring and improving quality of service and for throttling clients in the context of resource allocation. Embodiments of the invention further relate to systems and methods for allocating streams to clients, and allocating distributed segment processing (DSP) credits.

In one example, a cluster of servers (or a single server or node) may have resources that can be allocated to clients. These resources include streams, reads, writes, processing, deduplication, or the like. A particular server, for example, may be able to provide x number of streams, or a certain number of reads/writes. A particular server or cluster may be able to perform a certain amount of processing, for example, Distributed Segment Processing (DSP), which may be performed on its one or as part of another data protection operation such as a backup operation and/or a deduplication operation. As a whole, the cluster can also provide a larger number of streams, reads/writes, and processing. Embodiments of the invention relate to systems and methods for allocating these resources.

For example, embodiments of the invention further relate to systems and methods for ingesting data into a server. Ingesting data may include deduplicating the data, transmitting the data and writing the data to a backup. More specifically, during some data protection operations (backup, deduplication, etc.), the client may only send unique data to the server or data that has not been previously stored by the backup server.

Embodiments of the invention thus relate to allocating DSP credits, which can be used by clients to perform distributed segment processing.

In one example, the DSP credits may be combined with stream credits. Stream credits typically relate to streams of data between clients and servers. These credits can be used together. Alternatively, the DSP credits may also account for streaming resources or vice versa.

Figure 1:
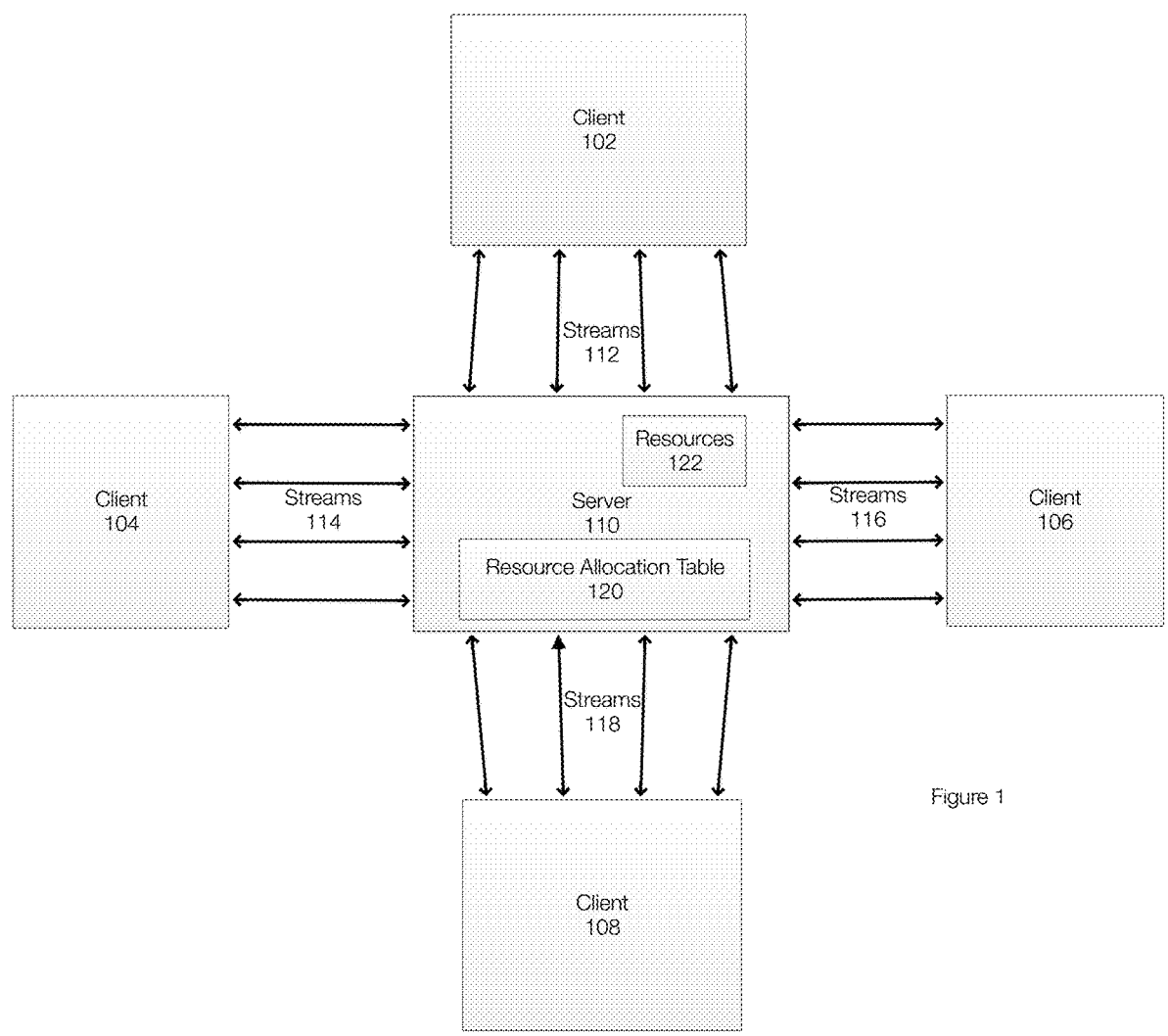
FIG. 1 illustrates an example of a server configured to allocate resources to clients.

FIG. 1 illustrates an example of a computing environment in which clients communicate with a server (or a cluster). In this example, the resources allocated to the client include resources 122. A client may be able to use resources 122 from one or multiple servers. Similarly, a server can provide multiple clients with resources 122.

These resources 122 may include read resources, write recurses, processing resources, segment processing resources, stream resources, or the like or combination thereof. The resources 122 are allocated such that the server or cluster operates in a safe allocation state. A safe allocation state is one in which all of the resource requests can be granted and serviced until completion. This may be achieved using a credit system. In order to account for multiple scenarios, there are different types of credits that can be granted. Each type, however, may relate to the resources being allocated. The different types of credits effectively represent a different response to credit requests. The credit system can be used to allocate different types of resources and/or to allocate multiple resources at the same time.

For example, the number of credits granted by the server or cluster may be equal to the number of credits requested, less than the number of credits requested, greater than the number of credits requested, zero, or negative. Issuing zero or negative credits allows the server to fully use resources but also throttle when necessary. This also allows the server or cluster to recover from an unsafe state and return to a safe allocation state. By way of example, the credits may be described as follows:

Prefetch credits: More than the number of credits requested by clients.
Partial credits: Less than (but greater than 0) number of credits requested by clients.
Equal credits: Equal to the number of credits requested by clients.
Zero credits: Equal to zero, indicating, current client request cannot be processed. The client needs to wait and retry obtaining credits.
Negative credits: A negative number, indicating to the client to release the number of cached credits.
The zero and negative credits allow the server to throttle a request from a client.
Embodiments of the invention further relate to systems and methods for ingesting data into a server. Ingesting data may include deduplicating the data, transmitting the data and/or writing the data to a backup. More specifically, during some data protection operations, the client may only send unique data to the server or data that has not been previously stored by the backup server.

In this example, FIG. 1 illustrates a server (e.g., a data protection or backup server) 110 that provides resources 122 (which may include to clients, represented by clients 102, 104, 106 and 108. The server 110 may also represent a cluster of nodes or servers. In one example, the clients 102, 104, 106 and 108 are streaming data (e.g., backup data or streams, restore streams, streams that include data for processing such as deduplication, etc.) to/from the server 110. The client 102, for example, may be backing up a plurality of virtual machines, a database, a file system, or other data type using streams 112. Similarly, the client 104 is associated with streams 114, the client 106 is associated with streams 116, and the client 108 is associated with streams 118.

In this example and assuming that the client is performing distributed segment processing, the server 110 is configured to allocate stream credits and/or segment credits to the clients 102, 104, 106 and 108. The server 102 is configured to perform resource allocation using, in one example, stream credits and/or segment credits. These credits can be managed using a resource allocation table 120. The resource allocation table 120 allows the state of allocation (e.g., safe, unsafe) to be determined. Whenever credits are issued (regardless of type), the allocation table 120 is updated so that the allocation state of the system can be evaluated in light of subsequent requests for credits.

In one example, a request for credits is evaluated to determine whether granting the request results in a safe allocation state. Generally, the request is granted if the resulting allocation state is safe. If the request results in an unsafe allocation state, then the request is denied, for example by issuing zero credits or by issuing negative credits.

In the following disclosure and by way of example only, it is assumed that 1 stream available is associated with 1 stream credit granted. Similarly, 1 segment process may represent a unit processing allocation. In other words and by way of example only, 1 credit represents 1 stream. Other credit per resource allocation schemes could be different. A server may grant x number of resources per credit, for example. The server 110 may grant a stream credit and/or a segment credits to a requesting client if it is possible for all streams/segment processing associated with all clients to finish executing.

Because the server 110 may not know when a particular client stream will terminate or how may more credits different clients will have requested by the time that the particular client finishes, the server 110 may assume that all clients will eventually attempt to acquire their maximum allowed credits, use the credits, and then release the credits.

On these assumptions, the server may determine if the allocation state is safe by finding a hypothetical set of credit requests by the clients that would allow each client to acquire its maximum requested credits and use the credits. If there is a state where no such set exists, this may result in the server 110 granting zero stream credits or negative stream credits. This may cause clients that receive these grants or requests to return any credits being held. Stated differently, the ability to grant or issue zero credits or negative credits allows the clients to be throttled. In one example, the client may self-throttle because they may not have sufficient credits or because they may need to return credits to the server 110. In this manner, the server then attempts to get back to a safe stream allocation state in order to grant the requested credits.

In another example, the system may divide the credits amongst the clients. This allows each client to request credits up to their maximum. However, a client may still be throttled based on processor state, processor usage, a tuning factor or the like.

Embodiments of the invention may allocate resources when the allocation state of the system resulting from a particular allocation is safe. If the proposed allocation results in an unsafe state, then the allocation may be made to return the system to a safe allocation state (e.g., by issuing negative or zero credits).

More specifically, embodiments of the invention further relate to systems and methods for ingesting data into a server. Ingesting data may include deduplicating the data, transmitting the data from the client to the server and writing the data to a backup. More specifically, during some data protection operations, the client may only send unique data to the server or data that has not been previously stored by the backup server. This is accomplished, by way of example, using fingerprints.

A fingerprint, by way of example, may be a hash of a data segment. The hash uniquely identifies the corresponding data. By identifying fingerprints that are not already present on the server, a determination can be made with respect to the data that needs to be sent to the server. Advantageously, the amount of data sent to the server is likely reduced.

Figure 2:
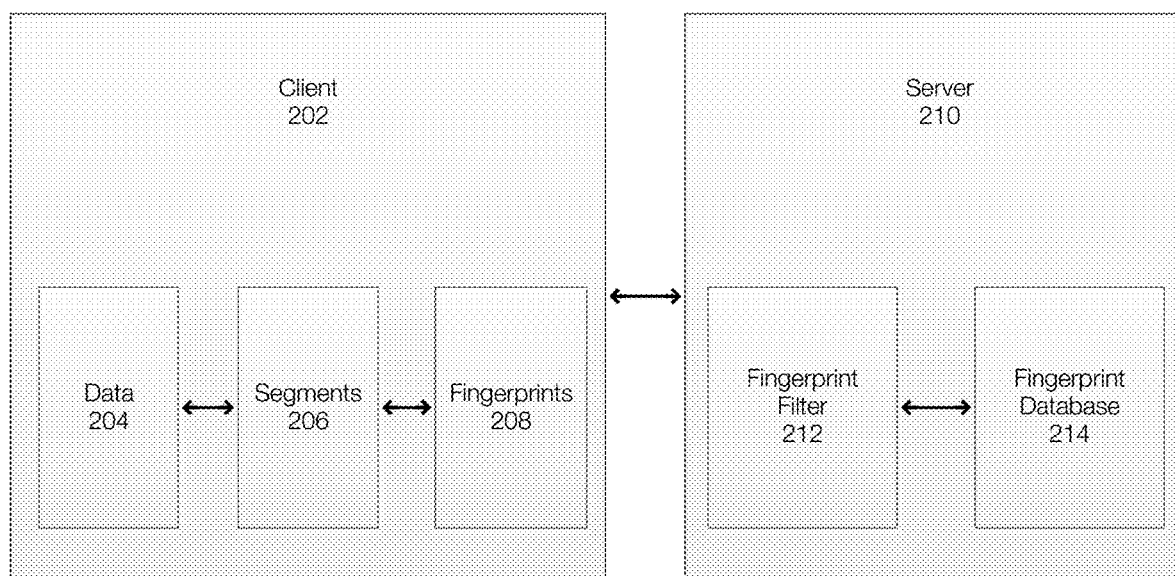
FIG. 2 illustrates an example of a client that uses segment credits to transfer data to a server.

FIG. 2 illustrates an example of a system that performs data protection operations including resource allocation for distributed segment processing. In one example, distributed segment processing is related to deduplication operations and/or backup operations. Further, in distributed segment processing, the processing may be distributed. For example, a client may segment the data and/or fingerprint the data. The server may identify unique fingerprints and thus unique data from the fingerprints provided by the client. This also allows the client to only send unique data during a backup operation.

FIG. 2 illustrates a client 202 that coordinates with a server 210 to perform data protection operations such as backup operations. In this example, the client 202, in conjunction with the server 210, is preparing to backup data 204. During this operation, the client 202 and/or the server 210 may perform a distributed segment processing operation.

More specifically, the data 204 is segmented into segments 206 and the fingerprints 208 are generated for each of the segments 206. The fingerprints 208 are then communicated to the server 210 for processing. The server 210 may compare the fingerprints 208 against a fingerprint database 214 using a fingerprint filter 212.

More specifically, the server 210 evaluates the fingerprints 208 to identify unique fingerprints that are not included in the fingerprint database 214. The unique or new fingerprints correspond to data segments that have not been previously backed up by the server 210. The server 210 may then indicate to the client 202 which of the fingerprints 208 are unique or new. The client 202 can then backup the data 204 by sending only the segments corresponding to the unique fingerprints that are not present in the fingerprint database 214. Once these segments are added to the backups maintained by the server 210, the new fingerprints are added to the fingerprint database 214. This allows distributed segment processing operations to be performed within the context, in one example, of a backup operation. In one example, distributed segment processing can be performed independently of the backup operation.

Data segment processing may be performed using distributed segment credits (referred to herein as segment credits), which are an example of credits and may be the same as or different from stream credits. Segment credits reflects that the processing related to distributed segment processing is distributed between the client and the server as previously stated. The segment credits help the system function improve. More specifically, the CPU or processors of the server 210 may be occupied with various tasks such as garbage collection, processing requests from other clients, or the like. As a result, the server 210 may not be able to process all of the fingerprints received from the client 202 in a timely manner. This may result in either none or partial filtering of the finger prints. Consequently, the client 202 will have to send multiple requests to the server 210 until all of the fingerprints have been processed and filtered on the server 210. By allocating resources using segment credits, the process improves because the client understands what resources are available and has a better expectation with regard to performance of the task. Further, QOS issues are alleviated because the resources are more fairly allocated to all of the clients that may be communicating with the server 212 or cluster. By issuing negative or zero credits, for example, embodiments of the invention ensure that a client with a high ingest rate that is utilizing all of the deduplication resources on the server does not delay the processing requirements of other clients. In other words, clients can be throttled or self-throttled through the use of credits such as segment credits.

Figure 3:
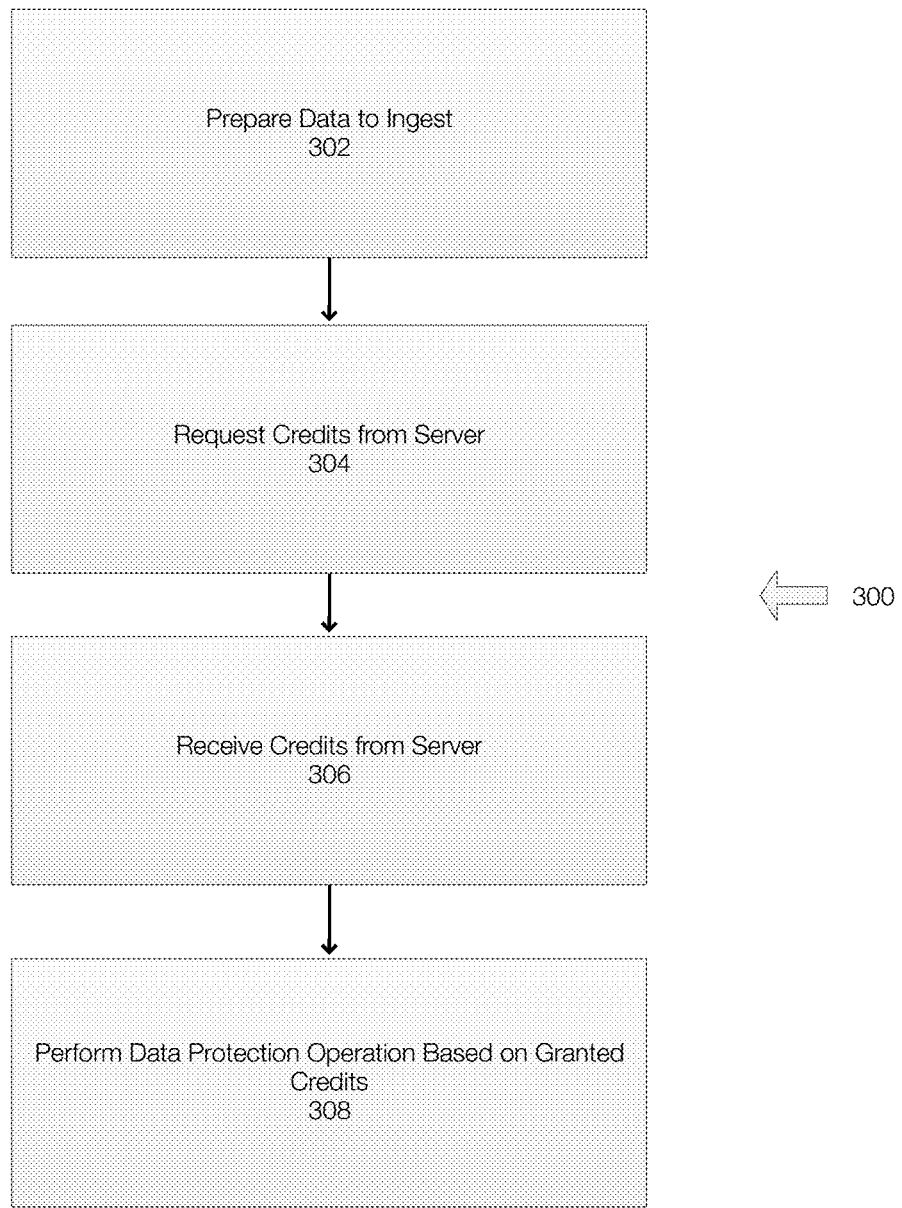
FIG. 3 illustrates an example of a method for allocating resources including processing or writes in a server or cluster.

FIG. 3 illustrates an example of a method for allocating resources to clients. The method 300 may begin by preparing 302 data to ingest. As previously stated, preparing the data may include identifying the data to backup, segmenting the data and generating fingerprints for each of the segments. This allows a client to determine the number of fingerprints to be sent to the server. These aspects of distributed segment processing may be performed by the client.

In one example, a segment credit may correspond to a fingerprint. Thus, the number of credits requested may depend on the number of fingerprints to send to the server for processing. Alternatively, a credit may be determined based on processing power (e.g., how many fingerprints can be processed using a percentage (e.g., 1%) of the CPU. In this case, the client may request 304 segment credits accordingly.

Once the client requests the credits, the client may receive 306 credits from the server. The number of credits granted by the server may be equal to the number of credits requested by the client, less than the number of credits requested by the client, greater than the number of credits requested by the client, zero, or negative.

Once credits have been received, the data protection operation (e.g., distributed segment processing, backup operation, etc.) is performed 308 based on the granted credits.

Figure 4:
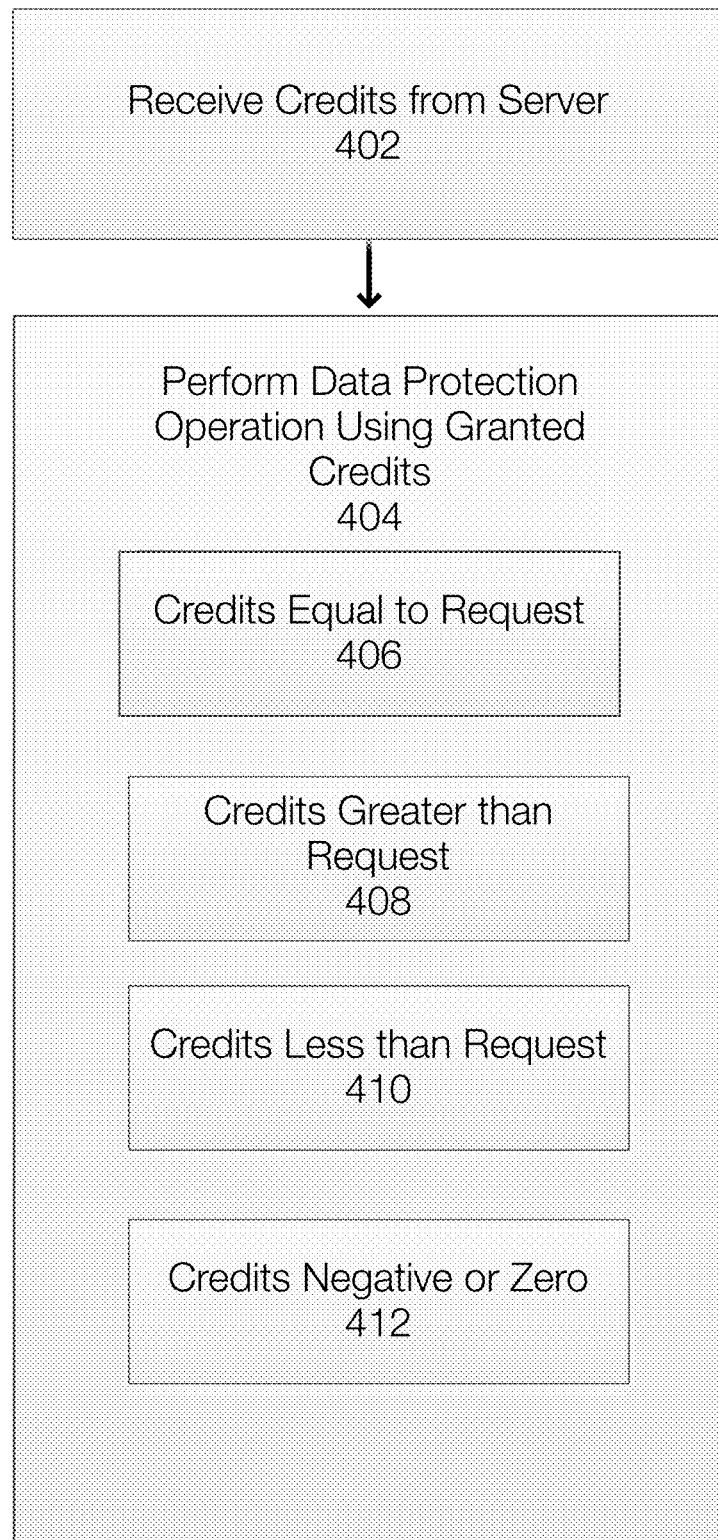
FIG. 4 is an example of a method for using credits granted by a server or cluster.

FIG. 4 illustrates an example of a method for using credits received from a server or cluster. In the method of FIG. 4 a client may receive 402 credits (DSP credits or other credit types) from a server. After receiving the credits, the client and/or the server may perform a data protection (e.g., DSP processing, deduplication, backup) operation using the credits granted 404 by the server.

For example, If the number of credits granted 406 equals (=) the number of credits requested, the client may use the granted segment credits to look for unique fingerprints on the server. As previously stated, the client may segment and fingerprint the data and send the resulting fingerprints to the server. The number of fingerprints sent to the server or the number of fingerprint requests is equal to the number of segment credits granted. As previously stated, this depends on how many fingerprints are processed per credit. One credit may correspond to one fingerprint. However, one credit may correspond to x credits. Another scheme may be used. The client can send each fingerprint individually or grouped in a batch to the server. The credits obtained and used by the client are tracked by the server in an allocation table.

If the number of credit granted 408>number of credits requested, the client uses the granted segment credits to look for unique fingerprints on the server (or to identify fingerprints that are not on the server, which identifies data not backed up by the server). In this case, the number of requests or fingerprints sent to the server is equal to the number of segment credits requested. The client can either keep the excess credits for a subsequent use or return any unused credits.

If the number of credit granted 410 is less than (<) the number of credits requested, the client uses the granted segment credits to look for unique fingerprints on the server. The number of requests issued by the client may use the segment credits granted. In this case, the client may need to request additional credits from the server to process any remaining fingerprints.

If the number of credit granted 412 equals 0, the client is throttled and no further operations (e.g., DSP operations) can be performed by the client. Other clients may be throttled as well. The client or server may retry after a certain time interval to retry the request. Alternatively, the client may issue a new request after a certain time period to obtain credits. Alternatively, the client may try an altered request (e.g., request fewer credits so that some of the processing can be performed.

If the number of credits granted 412 is a negative value, and if the client has some credits cached, the client must deduct its cached credits by the amount of negative credit granted and the client requests are throttled. If the client does not have any cached credits, then the client can ignore the negative credits granted value and simply throttle. After a time period, the client may try again to obtain credits.

Once the request has been granted and assuming that the client is not throttled, the server tries to find unique fingerprints using the fingerprints received from the client. Unique fingerprints are then sent back to the client. The client may then identify the segments corresponding to the unique fingerprints, compress the segments, and send the segments back to the server for storage as a backup. As discussed in more detail below, the segment credits may account for streaming resources. Alternatively, the client may need to request streaming credits in order to send data/fingerprints to the server.

If the client has no more data to ingest or backup and still has segment credits in a cache connection, the client can unilaterally release those credits by issuing a release credit command. The server then updates its allocation table to account for the credits released from a particular client.

Advantageously, once a client receives segment credits (stream credits or other credit types), the corresponding operation is mostly guaranteed because the allocation is based on resources available on the server. The clients do not need to keep retrying and sending requests to the server until all of the fingerprints are filtered. The operations are thus performed more efficiently and smoothly.

Figure 5:
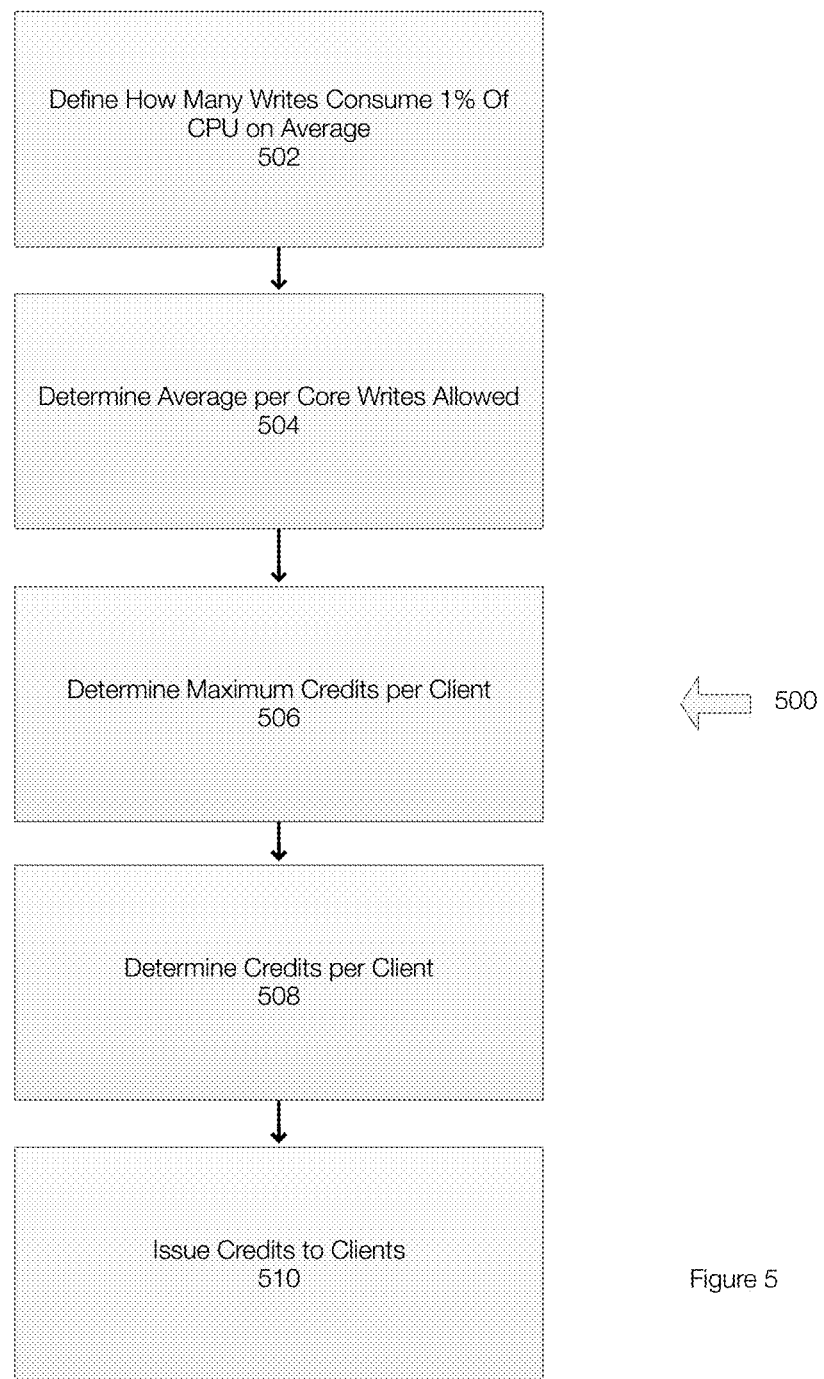
FIG. 5 is an example of a method for performing resource allocation during a data protection operation such as segment processing.

FIG. 5 illustrates an example of a credit allocation method 500. In another example, the method of FIG. 5 may be defined in terms of processing a fingerprint.

FIG. 5 more specifically illustrates an example of a method for allocating segment credits. The method 500 may include steps or acts that are not performed each time the method is performed. In FIG. 5, the amount or number of writes that consume 1% of a processor or core (e.g., a CPU or central processing unit) on average is determined or defined 502. While this number may be an approximation, gathering statistical data by doing empirical backup of data can be used to qualify this number. The percentage of CPU utilization during various backup runs of different sizes can be observed or measured. These observations or measurements can be used to determine the average number of writes that consume 1% of data. For example, if it is observed that a backup of 1 GB of data consumes 10% CPU and results in 10,000 write requests on average, it can be approximated that 1000 write requests to the server consume 1% of CPU. This result may be used to determine the number of segment credits to be allocated to requesting clients.

Next, the average number of per core writes allowed is determined 504. In one example, this is determined by multiplying the number of writes that consume 1% of the CPU with the average percentage of free CPU per core. If the average percentage of free CPU per core is less than a threshold (e.g., 2%), then the credits granted to all clients is zero or negative.

Next, the maximum credits per client are determined 506. This may be determined by multiplying the average per core writes allowed with the number of CPU cores and then dividing by the number of client connections. The maximum credits per client represents the maximum number of credits that a client may acquire.

The allocation table accounts for credits that have already been issued to the client. For example, if a client's maximum credits is 100 and 60 have already been granted, a request for 50 DSP/write credits may result in a grant of partial credits or zero credits or negative credits. The allocation table is updated as credits are granted, released, etc.

In one example, the number of credits per client are determined 508. This is distinct from the maximum credits because this act or step may account for a tuning factor that can be adjusted or is configurable. The tuning factor allows embodiments of the invention to factor in a reserve value into the resources being allocated. The tuning factor may be 50-70% of the maximum DSP/write credits.

Next, credits may be issued to requesting clients 510. The number of credits issued may be determined, by way of example, by using the minimum of the DSP/write credits requested and the calculated credits per client.

Consider the following example. If the number of writes (or fingerprint processing) that consume 1% of the CPU on average is 1000 and the average percentage of free CPU per core is 50%, then the average per core reads allowed is ((1000*0.5)=500). If the number of CPU cores is 4 and the number of clients is 10, then the maximum credits per client is ((500*4)/10=200). If the tuning factor is 50%, then the calculated credits per client is (200*0.5=100). Thus, there is a distinction between the maximum credits per client and the tuned or calculated credits per client.

If a client then requests 40 DSP/write credits, the granted DSP/write credits is MIN(40,100)=40. Thus 40 credits are granted. If the client requests prefetch, then the granted credits is MAX(40,100)=100. Thus 100 credits are granted. If restoring from the cloud, the prefetch may be ignored, in which case the granted credits may be 40 in this example.

Each time segment credits are requested, embodiments of the invention may ensure that the grant does not result in an unsafe allocation state. For example, requesting credits that exceeds a client's maximum credits may result in an unsafe allocation state. Further, the credits already used by the client and other clients may also be considered when granting credits. Also, when determining the allocation state, the average percentage of free CPU per core may be determined. If the grant drops the average percentage of free CPU below a threshold, then the grant may be for zero credits or negative credits until a safe allocation state is recovered.

The following discussion, with regard to stream credits, includes the following. This allocation method is described in more detail with regard to FIGS. 7B and 7C described below.

In one example, let C be the number of clients in the system and N be the number nodes or servers in the system.

Total (Maximum Streams) Availability Matrix (TAM): A matrix of length N indicating a maximum number of available stream resources for each node.

TAM[j]=k, there are k instances of stream resource Rj available.

Current Allocation Matrix (CALM): A C×N matrix that defines the number of stream resources currently allocated to each client.

CALM[i,j]=k, then client Ci is currently allocated k instances of stream resource Rj.

Current Availability Matrix (CAM): A matrix of length N indicating the current number of streams available for each node type. This is determined by adding currently allocated streams for all the clients on each individual nodes and subtracting the result from the total maximum streams for that node.

CAM[j]=TAM[j]-(CALM[C0]+CALM[C1]+ . . . +CALM[CN]);

Current Demand Matrix (CDM): An C×N matrix that defines the current demand or the point in time maximum requested streams.

If CDM[i,j]=k, then client Ci may request at most k instances of stream resource Rj.

Current Need Matrix (CNM): A C×N matrix indicates the stream credit needs for each clients. (Need=Demand–Allocated).

CNM[i,j]=CDM[i,j]-CALM[i,j].

At any point of time, the server determines if it is safe to allocate stream credits in response to the client credits requested. The system is in safe state, if at a given point in time, all client credit requests can be satisfied, i.e. for all clients, their stream resource needs are less that the current streams availability for all the nodes in a system.

CNM[i,j]<CAM[j]

If stream needs of a client is greater than the streams available (CNM[i, j]>CAM[j]), the system is considered unsafe (unsafe allocation state) and negative or zero credits are granted to clients and an effort is made to bring the system to safe/stable stream allocation state.

Figure 6:
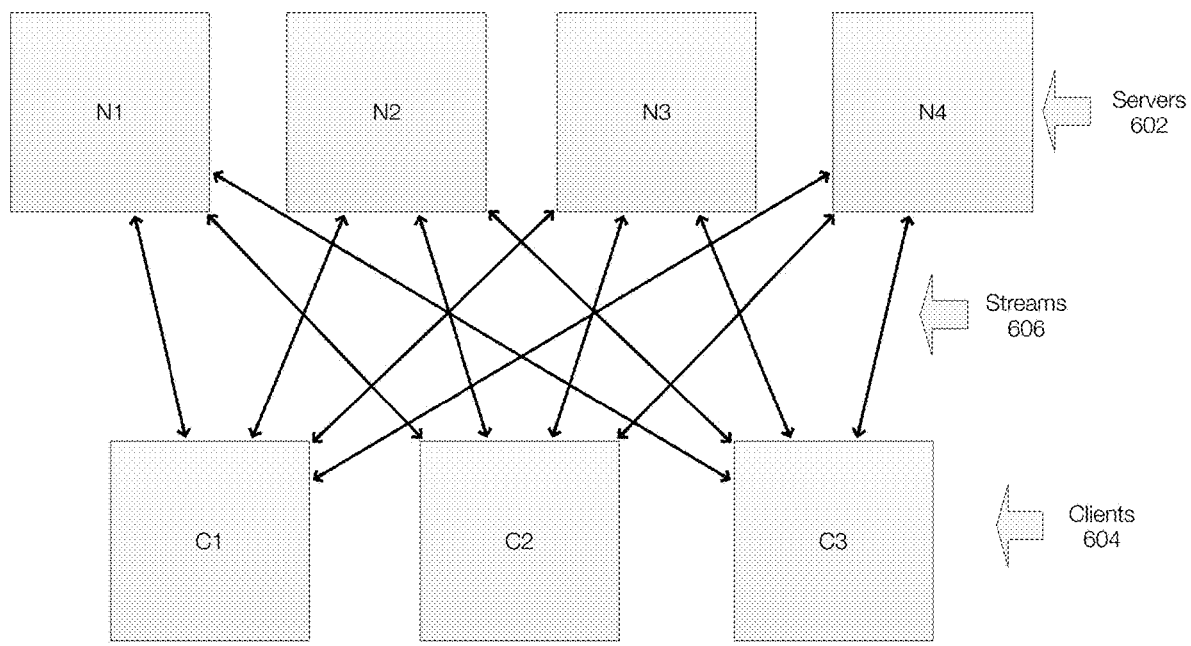
FIG. 6 further illustrates resource allocation including stream allocation in the context of cluster or server resources.

The following examples illustrate this process in more detail. FIG. 6 illustrates a cluster that includes nodes or servers 602 and clients 604. More specifically, FIG. 6 illustrates four nodes or servers: N1, N2, N3 and N4. FIG. 6 also illustrates clients C1, C2 and C3 (clients 604) that use resources of the servers 602. In this example, the resources of the servers 602 allocated to the clients 604 includes streams 606. The streams 606 may include backup streams, restore streams, or other data streams.

As an example, let us assume that in FIG. 6, the TAM or total maximum streams available on each of the nodes is represented as follows:

| N1 | N2 | N3 | N4 |
|----|----|----|----|
| 60 | 50 | 70 | 60 |

Thus, N1 has 60 streams for allocation to clients. Similarly, N2, N3 and N4 have 50, 70 and 60 streams, respectively, for allocation to clients.

The total maximum streams can be determined by considering the number of processors and cores on a server and by determining how much processing power a stream consumes. The total maximum streams can be determined in other ways, such as by testing or by user input.

The CALM matrix below indicates the stream credits that have already been allocated to the client C1-C3. In this example, assume that clients C1, C2 and C3 have the following stream credits already allocated to them.

|    | N1 | N2 | N3 | N4 |
|----|----|----|----|----|
| C1 | 10 | 20 | 20 | 10 |
| C2 | 10 | 00 | 30 | 30 |
| C3 | 10 | 20 | 10 | 00 |
| CALM | | | | |

The CAM or the current streams available (or streams that have not been allocated) can be calculated from the TAM and CALM above. For example: Node N1 has 60 maximum streams that it can allocate from the TAM matrix above. Node N1 has already allocated 10 streams to C1, C2 and C3 respectively. So total streams currently available on N1 is CAM[N1]=TAM[N1]-(CALM[0,C1]+CALM[0,C2]+CALM[0,C3]) i.e.

CAM[N1]=60-(10+10+10)=30.

Similarly,

CAM[N2]=50-(20+0+20)=10.

CAM[N3]=70-(20+30+10)=10.

CAM[N4]=60-(10+30+0)=20

| N1 | N2 | N3 | N4 | | | N1 | N2 | N3 | N4 | | | N1 | N2 | N3 | N4 |
|----|----|----|----|---|----|----|----|----|----|---|---|----|----|----|----|
| 60 | 50 | 70 | 60 | – | C1 | 10 | 20 | 20 | 10 | = | | 30 | 10 | 10 | 20 |
| TAM | | | | | C2 | 10 | 00 | 30 | 30 | | | CAM | | | |
| | | | | | C3 | 10 | 20 | 10 | 00 | | | | | | |
| | | | | | CALM | | | | | | | | | | |

More generally, the CAM identifies which nodes or servers are providing the streams allocated to the clients 604. As previously stated, The clients 604 can connect to any of the servers 602 and can therefore request credits from any of the servers 602 in the cluster.

The following CDM defines the maximum client stream credit request at a given point in time. In other words, the following matrix defines how many streams each client can request from each of the servers at a given point in time. These numbers or maximums can be predetermined and set by an administrator. Further, these numbers may be dynamic and may be based on the number of clients and/or the number of servers. As the numbers of servers and clients changed, the point in time stream credit request numbers may change.

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |
|    |    | CDM |   |   |

By subtracting Current Allocated streams Matric (CALM) from Current Demand Matrix (CDM), the total stream credit needed or the CNM for C1, C2 and C3 can be determined as follows:

|    | N1 | N2 | N3 | N4 |   |    | N1 | N2 | N3 | N4 |   |    | N1 | N2 | N3 | N4 |
|----|----|----|----|----|---|----|----|----|----|----|---|----|----|----|----|----|
| C1 | 30 | 30 | 20 | 20 | − | C1 | 10 | 20 | 20 | 10 | = | C1 | 20 | 10 | 00 | 10 |
| C2 | 10 | 20 | 30 | 40 |   | C2 | 10 | 00 | 30 | 30 |   | C2 | 00 | 20 | 00 | 10 |
| C3 | 10 | 30 | 50 | 00 |   | C3 | 10 | 20 | 10 | 00 |   | C3 | 00 | 10 | 40 | 00 |
|    |    | CDM |   |   |   |    |    | CALM |   |   |   |    |    | CNM |   |   |

Using the above information, it is possible to determine whether each client can acquire and use its maximum requested stream credits. The following format is used in the following discussion <xx xx xx xx> represents streams associated with, respectively, nodes N1, N2, N3 and N4.

For example, from the CNM, C1 requests and acquires 20 N1 stream credits, 10 N2 stream credits and 10 N4 stream credits to achieve is maximum requested credits. The server may perform this determination prior to actually granting the request.

After C1 requests and acquires the available streams are now determined as follows:
<30 10 10 20> (CAM or available streams)−
<20 10 00 10> (streams acquired by C1 to reach C1's max)=
<10 00 10 10> (Streams still available)

Thus, the cluster still has 10 N1 streams, 00 N2 streams, 10 N3 streams and 10 N4 streams available.

Next, C1 terminates the processes associated with the streams and returns 30 N1, 30 N2, 20 N3 and 20 N4 stream credits back to the system. These are the streams associated with the C1 row in the CDM. Adding it to the streams currently available <10 00 10 10>+<30 30 20 20>=<40 30 30 30>

As a result, the cluster now has 40 N1, 30 N2, 30 N3, and 30 N4 total streams available. This <40 30 30 30> is less than or equal to the TAM <60 50 70 60> or the total maximum stream for each node of the cluster i.e.
<40 30 30 30><=<60 50 70 60> so the system state is safe to allocate and to process next client request.

C2 now acquires 20 N1 streams and 10 N4 streams. C2 then terminates and returns all of its stream credits. In this example and after these steps, the available streams are or equals:
<40 30 30 30> (streams currently available prior to C2's request)−
<00 20 00 10> (streams acquired by C2 to reach C2's max)=
<40 30 30 30>−<00 20 00 10>=<40 10 30 20> (streams still available)+
<10 20 30 40> (streams associated with the C2 row in the CDM) <10 20 30 40>+<40 10 30 20>=<50 30 60 60> (streams available after C2 returns stream credits).
This <50 30 60 60> is less than or equal to the TAM <60 50 70 60> or the total maximum stream for each node of the cluster i.e.

<50 30 60 60><=<60 50 70 60> so the system state is safe to allocate and process to process next client request.

Next, C3 acquires 10 N2 and 40 N3 streams, terminates and returns all streams (returns stream credits). This results in the following:
<50 30 60 60> (currently available streams prior to C3's)−
<00 10 40 00> (streams acquired by C3 to reach C3's max)+
<10 30 50 00> (streams returned by C3)=
<60 50 70 60> (stream credits available).

This <60 50 70 60> is less than or equal to the TAM <60 50 70 60> or the total maximum stream for each node of the cluster i.e.
<60 50 70 60><=<60 50 70 60> so the system state is safe to allocate and process to process next client request.

This demonstrates that because it is possible for each client to acquire its maximum requested stream credits and use the stream credits, the stream allocation states are safe and stream credits can be granted to all clients as described above.

A stream allocation safe state indicates that stream credits can be granted or issued. Embodiments of the invention contemplate several different kinds of credits that can be requested and granted.

The following examples illustrate these types of credits and illustrates whether the credits are granted.

Example 1: A Server Grants "Equal" Credits

Starting in the same state as the previous example started in, assume C3 requests 10 streams credits on node N3. In this example, there are enough available streams such that the credit request can be granted. After the grant, the new stream allocation state is as follows:

CAM or the Available streams on nodes:

|                    | N1 | N2 | N3 | N4 |
|--------------------|----|----|----|----|
| Available Streams  | 30 | 10 | 00 | 20 |

The CALM streams currently allocated to the clients 604 is now as follows (this assumes that C3's request for 10 N3 credits is granted):

|    | N1 | N2 | N3 | N4 |
|----|----|----|----|----|
| C1 | 10 | 20 | 20 | 10 |
| C2 | 10 | 00 | 30 | 30 |
| C3 | 10 | 20 | 20 | 00 |
|    |    | CALM |   |   |

Now, the clients maximum requested streams is as follows:

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |
|    |    | CDM |   |    |

With this information, a determination can be made as to whether the new stream allocation state is safe.

|    | N1 | N2 | N3 | N4 |   |    | N1 | N2 | N3 | N4 |   |    | N1 | N2 | N3 | N4 |
|----|----|----|----|----|---|----|----|----|----|----|---|----|----|----|----|----|
| C1 | 30 | 30 | 20 | 20 | − | C1 | 10 | 20 | 20 | 10 | = | C1 | 20 | 10 | 00 | 10 |
| C2 | 10 | 20 | 30 | 40 |   | C2 | 10 | 00 | 30 | 30 |   | C2 | 00 | 20 | 00 | 10 |
| C3 | 10 | 30 | 50 | 00 |   | C3 | 10 | 20 | 20 | 00 |   | C3 | 00 | 10 | 30 | 00 |
|    | CDM |   |   |    |   |    | CALM |   |   |    |   |    | CNM |   |   |    |

In the above example, C1 can acquire 20 N1, 10 N2 and 10 N4 streams, use them and release them. Then, C2 can acquire 20 N2 and 10 N4 streams, use them and release them. Finally, C3 can acquire 10 N2 and 30 N3 streams, use them and then release them. Therefore, this new allocation state is safe.

Because the new state is safe, the request from C3 for 10 streams credits on node N3 is granted. This is an example of a server granting stream credits equal to the number of stream credits requested by the client.

Example 2: Server Grants "Partial" Credits

Starting in the same state that the previous example started in, assume C3 requests 20 streams credits on N3. In this example, the streams available before granting the requested stream credits is as follows:

| N1 | N2 | N3 | N4 |
|----|----|----|----|
| 30 | 10 | 10 | 20 |

The streams available after granting the stream credits is as follows:

| N1 | N2 | N3  | N4 |
|----|----|-----|----|
| 30 | 10 | −10 | 20 |

Because the number of total streams available after the grant is less than zero, the server may decide to grant 10 stream credits (which is a partial grant because 20 stream credits were requested). As previously stated with respect to the previous example, granting 10 stream credits to C3 from N3 results in a safe allocation state. This illustrates an example of a partial grant of stream credits.

Example 3: "Zero" or "Negative" Stream Credit Allocation

From the previous starting state, assume that client C2 requests 10 stream credits from node N2. In this example, there are enough streams to grant stream credits. Assuming that the request is granted, the new state would be:

CAM or the Available streams on nodes:

|                    | N1 | N2 | N3 | N4 |
|--------------------|----|----|----|----|
| Available Streams  | 30 | 00 | 10 | 20 |

The CALM or currently allocated streams according to the initial state:

|    | N1 | N2 | N3 | N4 |
|----|----|----|----|----|
| C1 | 10 | 20 | 20 | 10 |
| C2 | 10 | 10 | 30 | 30 |
| C3 | 10 | 20 | 10 | 00 |
|    |    | CALM |  |    |

The CDM or the point in time maximum requested streams is determined as follows:

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |
|    |    | CDM |   |    |

Now a determination is made to determine if the new allocation state is safe. Assuming that clients C1, C2 and C3 request more stream credits from N2 and N3.

|    | N1 | N2 | N3 | N4 |   |    | N1 | N2 | N3 | N4 |   |    | N1 | N2 | N3 | N4 |
|----|----|----|----|----|---|----|----|----|----|----|---|----|----|----|----|----|
| C1 | 30 | 30 | 20 | 20 | − | C1 | 10 | 20 | 20 | 10 | = | C1 | 20 | 10 | 00 | 10 |
| C2 | 10 | 20 | 30 | 40 |   | C2 | 10 | 10 | 30 | 30 |   | C2 | 00 | 10 | 00 | 10 |
| C3 | 10 | 30 | 50 | 00 |   | C3 | 10 | 20 | 10 | 00 |   | C3 | 00 | 10 | 40 | 00 |
|    | CDM |   |   |    |   |    | CALM |   |   |    |   |    | CNM |   |   |    |

In this case, C1 is unable to acquire enough streams from N2 i.e. from the CNM above, it needs 10 streams from N2. However, according to the CAM above, the number of streams available for N2 is 0. Also, C2 is unable to acquire enough streams from N2, and C3 is unable to acquire enough streams from N2.

None of the clients in this example can acquire enough stream credits to achieve their maximum allowed stream credits. As a result, this state is not safe and the server 602 may throttle one or more of the clients 604 and recover from the unsafe allocation state by issuing negative credits. In other words, the servers 602 recover from this unsafe state by throttling and issuing negative credits.

For example, the server N2 may grant negative 20 stream credits to C1. Optionally, N2 grants zero credits to clients C2 and C3 (i.e., clients C2 and C3 throttle and retry their requests after some time). Client C1 returns the 20 stream credits it holds to N2 and the safe allocation state check is performed to determine if the state is safe.

Credits, such as stream credits and other types of credits are used to perform resource allocation. The stream allocation method can be applied to many types of streams. The stream allocation method may maintain stable stream allocation states by granting negative/zero credits to various clients. Further, embodiments of the invention allow for different types of credit grants as previously described.

More specifically, stream credits may be prefetched. If a client holds no stream credits (or even if the client holds some stream credits) and if there are enough free streams on the server, the server can grant the client more credits then requested.

Prefetching credits may be requested, for example based on anticipated workloads. This may apply, for example, during a restore operation where the stream credits are used in anticipation of restoring a stream by reading a backup.

Granted credits can also be used to make decisions related to the sizing of the client size cache. This relates, for example, to reading ahead with stream credits used for the restore operation, performing an intelligent read ahead, or using credits to manage the cost of a solution.

A partial grant of credits can allow operations to be partially completed. Further, stream credits can be retrieved from the clients by issuing negative credits and flushing the number of negative credits from a client's cache. In other words, a client may be throttled if the number of granted credits is zero or negative. Further different credit allocation methods may be implemented based on the type of credits requested.

Figure 7A:
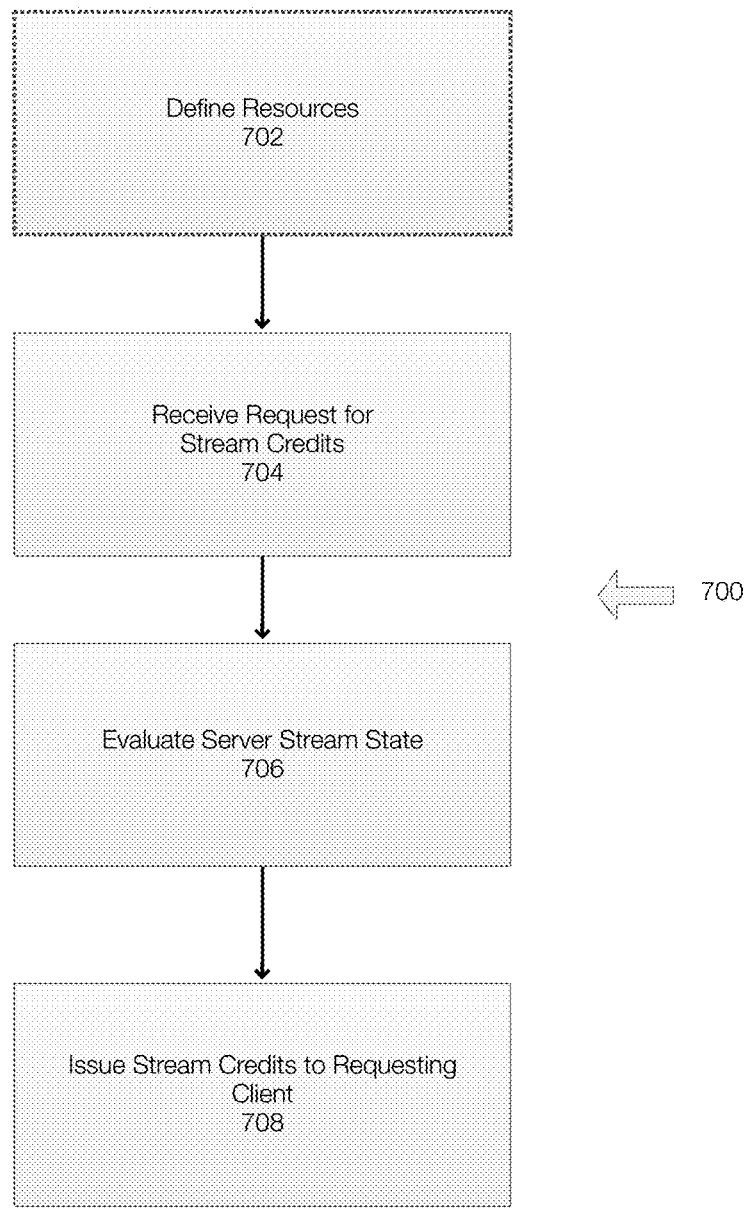
FIG. 7A illustrates an example of a method for performing resource allocation and in particular for allocating streams in a computing environment.

FIG. 7A illustrates an example of a method for performing resource allocation. In one example, various parameters associated with the resource allocation may be defined 702 or determined. For example, a determination may be made regarding how many streams each node or server can safely support. This may be based on number of processors/cores, memory, write/read parameters or the like. For example, a relationship between writes, processor or core consumption may be determined. If a predetermined number of writes or a data transmission rate consumes 1% of a CPU, then a stream at that transmission rate may correspond to 1 credit. Also, the maximum number of streams allowed per client may be determined.

This aspect of the method 700 may be performed at a single time. However, this aspect of the method 700 can be reevaluated as nodes are added/removed or as clients are added/removed from the system. These values may also account for other functions performed by the servers 602 that may not involve streams or that may not involve the particular resource being allocated. Further, these values may be able to vary based on other factors such as time of day. For example, when the processor is not required for other tasks such as during a slower period, it may be possible to temporarily increase the number of available streams.

Once the resource allocations have been defined and the server is allocating resources to the clients, the method 700 enforces or performs the allocation method. For example, a request for stream credits may be received 704. This request is evaluated as discussed previously to determine whether the requested allocation results in a safe allocation state. Thus, the server may evaluate 706 the stream state or the allocation state by hypothetically granting the request. This involves considering whether the other clients could still be allocated their maximum credits. As previously stated, in one embodiment, it is assumed that clients may ultimately request, use and release their maximum credits allowed. The evaluation thus determines what the allocation state would be if the request were granted.

The server then issues credits 708 according to the result (the determined allocation state) to the requesting client (and/or to other clients). If the allocation state is safe, the server may issue credits equal to the request or greater than equal to the request. If the allocation state is not safe, a partial grant may occur that still results in a safe allocation state. If the allocation state is not safe, the server may issue zero or negative credits. In one example, the zero and/or negative credits could be issued to any of the clients.

Figure 7B:
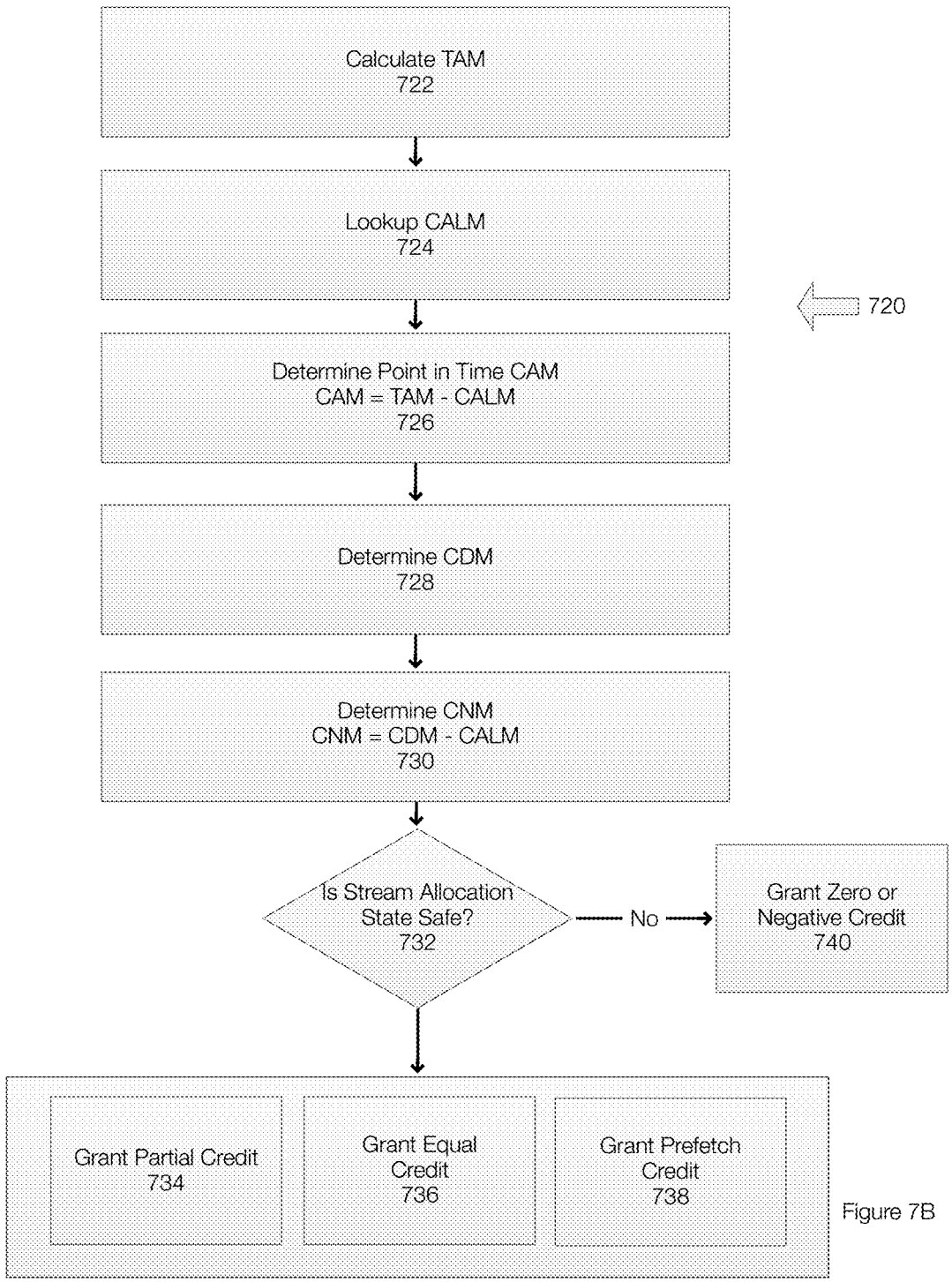
FIG. 7B illustrates an example of a method for evaluating a stream allocation state of a node or a server or a cluster.

FIG. 7B illustrates an example of evaluating the stream state in more detail. More specifically, FIG. 7B illustrates an example of evaluating the server stream state 706 shown in FIG. 7A. Thus, the method 720 illustrates an example of evaluating the server stream state 706. In an example of the method 720, the server may calculate the TAM 722, which determines the total streams available. The server may then lookup the CALM 724. The CALM identifies the streams that are currently allocated to the clients.

Next, the point in time CAM is determined 726. This is determined by subtracting the CALM from the TAM (CAM=TAM−CALM). This allows the server to determine how many streams are available for allocation. This can be determined from the perspective of the system as whole and/or on a per node or per server basis. As discussed above, the number of available streams may be determined on a per server basis. In one example, this ensures that the resources of a particular server are not overtaxed. Plus, in one embodiment, this may give the server or cluster flexibility in determining which servers provide or allocate resources. For example, it may be possible for a server to redirect a request to a different server if the redirection would result in a safe allocation state.

Next, the CDM is determined 728 and the CNM is determined 730 by subtracting the CALM from the CDM (CNM=CDM−CALM).

After this information has been determined, a determination 732 is made as to whether the stream allocation state is safe or unsafe. If the stream allocation state is not safe, then zero or negative credits are granted 740. If the stream allocation state is safe, then credits are granted. For example, partial credits may be granted 734, equal credits may be granted 736, or prefetch credits may be granted 738. The credits are then issued 708. In one example, issuing credits 708 may be part of the method 720 and is incorporated into the granting of credits 734, 736, 738 or 740.

Figure 7C:
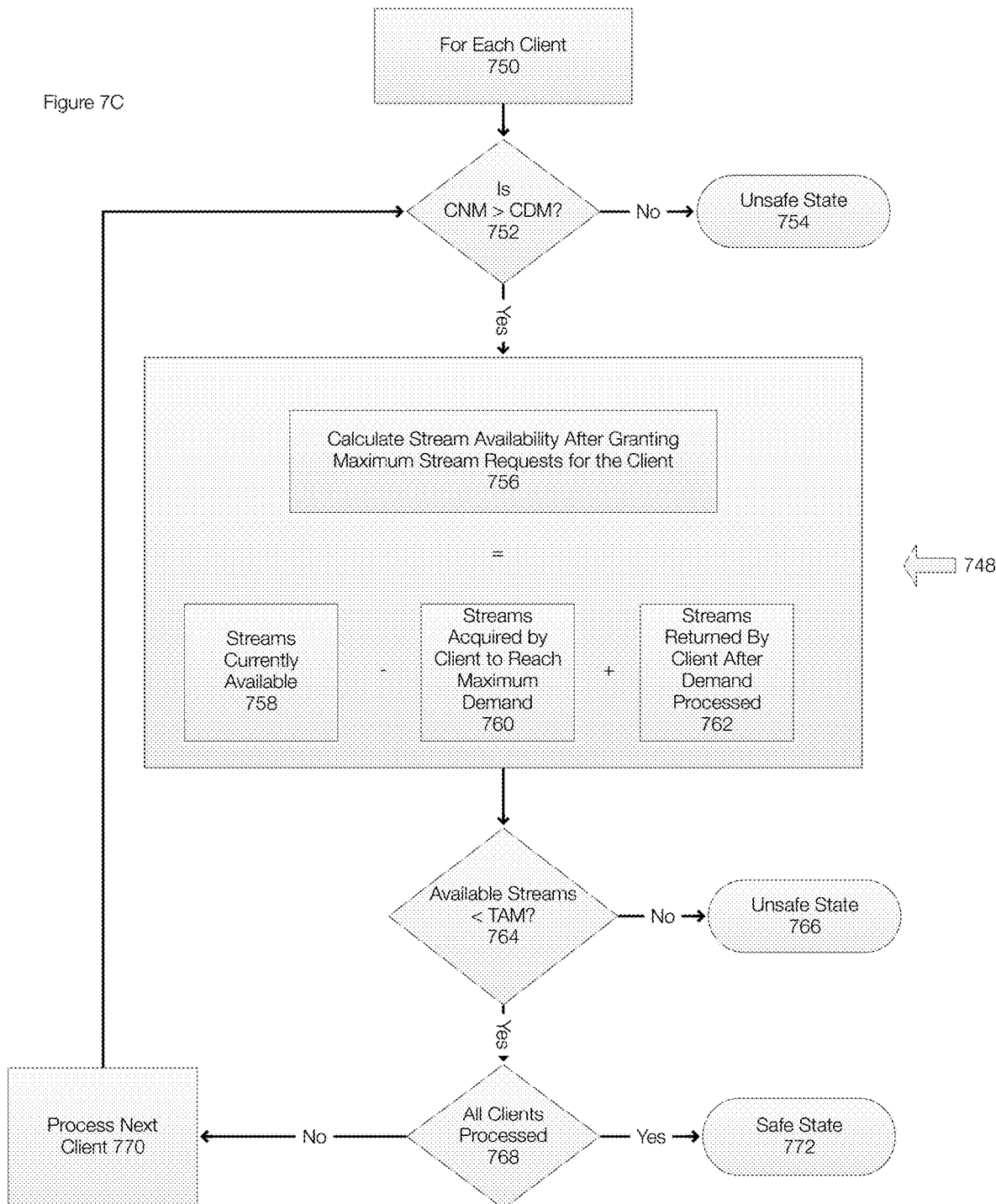
FIG. 7C further illustrates the method for evaluating the stream allocation state of FIG. 7B.

FIG. 7C illustrates an example of determining a stream allocation state. More specifically, FIG. 7C illustrates an example of determining if the stream allocation state is safe 732 in FIG. 7B. The method 748 may be performed for each client 750. Staring with a first client 750, a determination is made to determine 752 if CNM is greater than CDM. Thus, if the current need is not greater than the current demand, then the state is unsafe 754 and negative or zero credits are issued or granted as shown in FIG. 7B.

When the CNM is greater than the CDM, then the stream availability after granting the maximum stream requests for the client is determined 756. This computation may be performed as if the requested credits were granted to determine whether the resulting state is safe. Further, all clients, in one embodiment, are evaluated as a whole to determine whether the stream allocation state is safe.

In one example, the stream availability (756) is determined by subtracting the streams acquired by the client to reach the client's maximum demand 760 from the number of streams currently available 758 (this may be done as a whole or on a per server or node basis). This result is then added to the streams returned by the client after the demand is processed 762. In other words, the system evaluates the state assuming, in one example, that the clients requested and are granted their maximum possible streams.

Based on this determination 756, a determination is made as to whether the available streams is less than the total available matrix 764. If not, the state is unsafe 766. If so and all clients have been processed 768, the state is safe 772 and the credits can be granted as shown in FIG. 7B. If all clients are not processed, the next client is processed 770.

FIGS. 7A-7C thus illustrate an example of a method for allocating resources such that the allocation state of the system is safe. When a proposed allocation of resources (e.g., a request from a client) results in an unsafe allocation state, then the allocation may be zero or negative, which allows the system to either avoid an unsafe allocation state or return to a safe allocation state.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allocating resources of a cluster of servers to connected clients, the method comprising:
receiving a request for credits from a client, wherein each credit corresponds to resources of the cluster;
determining, by the cluster, whether the credits requested by the client result in a safe allocation state for all of the clients, wherein the cluster determines whether the allocation state is safe by finding a hypothetical credit request that allows at least one other client to request and use their maximum allowed credits, wherein the allocation state is safe when credit request is found and wherein the allocation state is not safe when the credit request is not found; and issuing the credits requested by the client to the client such that the allocation state is safe.

2. The method of claim 1, further comprising determining that the allocation state is safe when a set of credit requests allows each of the clients to request and use their maximum allowed credits.

3. The method of claim 2, further comprising determining whether all of the other clients can request and use their maximum allowed credits individually, wherein the allocation state is safe when all of the other clients can request and use their maximum allowed credits.

4. The method of claim 3, wherein the maximum allowed credits of each of the clients is evaluated independently of the maximum allowed credits of other clients by considering whether each of the clients can request and use their maximum allowed credits in succession.

5. The method of claim 1, further comprising determining whether a first client can request and use their maximum allowed credits and then determining whether a second client can request and use their maximum allowed credits, wherein the determination for the first client does not impact the determination for the second client.

6. The method of claim 1, wherein the cluster maintains matrices including a total availability matrix identifying a maximum number of credits available from each server in the cluster, a current availability matric identifying a number of credits available from each of the servers, a current demand matrix identifying the maximum allowed credits of each of the clients, and a current need matrix identifying credit needs for each of the clients, further comprising determining whether the allocation state is safe based on the matrices.

7. The method of claim 1, further comprising determining that the allocation state is unsafe and issuing the credits in a number that is one of:
less than a number of the credits requested by the client;
zero; or
negative.

8. The method of claim 1, wherein the credits are one of segment credits for segment processing operations, stream credits for streaming operations, credits for identifying unique fingerprints corresponding to segments that are not stored by the cluster, or restore credits for restoring operations.

9. The method of claim 1, further comprising throttling the client when the number of credits issued is zero or negative.

10. The method of claim 1, further comprising releasing credits by the client.

11. A non-transitory computer readable medium including computer executable instructions configured to be executed by a processor for performing a method, the method comprising:
receiving a request for credits from a client, wherein each credit corresponds to resources of the cluster;
determining, by the cluster, whether the credits requested by the client result in a safe allocation state for all of the clients, wherein the cluster determines whether the allocation state is safe by finding a hypothetical credit request that allows at least one other client to request and use their maximum allowed credits, wherein the allocation state is safe when credit request is found and wherein the allocation state is not safe when the credit request is not found; and
issuing the credits requested by the client to the client such that the allocation state is safe.

12. The non-transitory computer readable medium of claim 11, further comprising determining that the allocation state is safe when a set of credit requests allows each of the clients to request and use their maximum allowed credits.

13. The non-transitory computer readable medium of claim 12, further comprising determining whether all of the other clients can request and use their maximum allowed credits individually, wherein the allocation state is safe when all of the other clients can request and use their maximum allowed credits.

14. The non-transitory computer readable medium of claim 13, wherein the maximum allowed credits of each of the clients is evaluated independently of the maximum allowed credits of other clients by considering whether each of the clients can request and use their maximum allowed credits in succession.

15. The non-transitory computer readable medium of claim 14, further comprising determining whether a first client can request and use their maximum allowed credits and then determining whether a second client can request and use their maximum allowed credits, wherein the determination for the first client does not impact the determination for the second client.

16. The non-transitory computer readable medium of claim 11, wherein the cluster maintains matrices including a total availability matrix identifying a maximum number of credits available from each server in the cluster, a current availability matric identifying a number of credits available from each of the servers, a current demand matrix identifying the maximum allowed credits of each of the clients, and a current need matrix identifying credit needs for each of the clients, further comprising determining whether the allocation state is safe based on the matrices.

17. The non-transitory computer readable medium of claim 11, further comprising determining that the allocation state is unsafe and issuing the credits in a number that is one of:
less than a number of the credits requested by the client;
zero; or
negative.

18. The non-transitory computer readable medium of claim 11, wherein the credits are one of segment credits for segment processing operations, stream credits for streaming operations, credits for identifying unique fingerprints corresponding to segments that are not stored by the cluster, or restore credits for restoring operations.

19. The non-transitory computer readable medium of claim 11, further comprising throttling the client when the number of credits issued is zero or negative.

20. The non-transitory computer readable medium of claim 11, further comprising releasing credits by the client.

* * * * *